T. C. RIDDELL.
Baking Pan.
No. 69,939.
Patented Oct. 15, 1867.
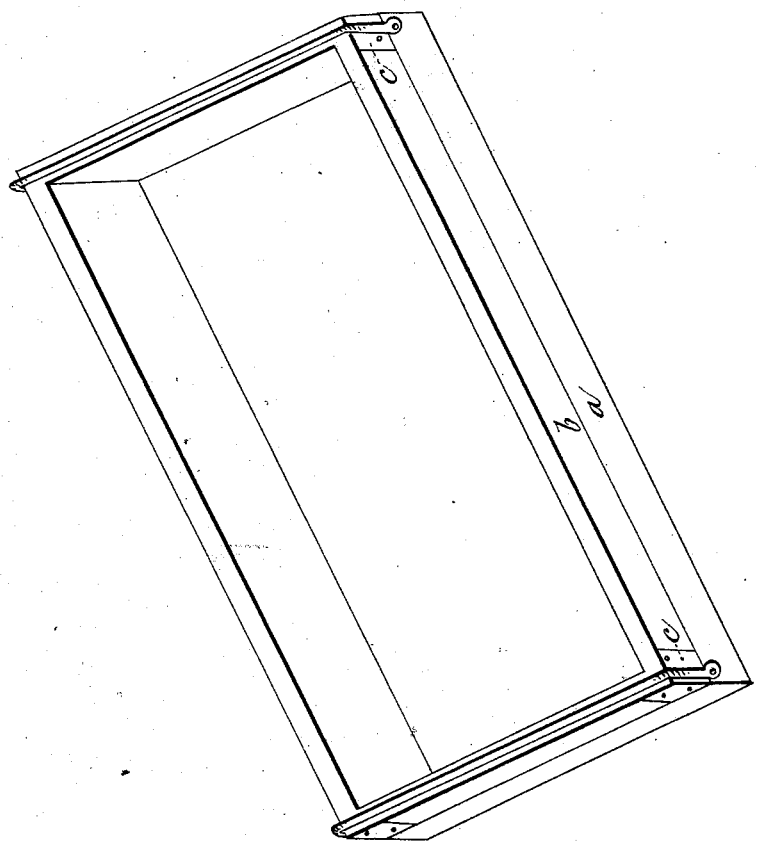
WITNESSES:
INVENTOR:
Thomas C. Riddell

United States Patent Office.

THOMAS C. RIDDELL, OF WILMINGTON, DELAWARE.

Letters Patent No. 69,939, dated October 15, 1867.

---

BAKING-FRAME.

---

The Schedule referred to in these Letters Patent and making part of the same.

---

TO ALL WHOM IT MAY CONCERN:

Be it known that I, THOMAS C. RIDDELL, of the city of Wilmington, in the State of Delaware, have invented a new and improved "Baking-Frame;" and I do hereby declare that the following is a full and exact description thereof, reference being had to the accompanying isometrical drawing, and to the letters of reference marked thereon.

The nature of my invention consists in providing the ordinary baking-pan with a frame of wood, braced together at the corners by iron clamps, with stirrups for holding the frame tightly to its place.

The drawing represents the pan $a$, with the frame $b$ held in position by means of the stirrups $c$ $c$. When the bread is set in the frame and placed in the oven, the inside of the frame being greased to prevent sticking, the wooden frame prevents the heat from taking hold of the bread in contact therewith, and throwing it out of shape, and also prevents the hard crust (common to bread baked in the ordinary way) from forming on the outside edges of the loaves. Bread baked in these frames turns out a finer-grained and more palatable loaf than that baked in any other manner.

What I claim as my invention, and desire to secure by Letters Patent, is—

Providing the ordinary baking-pan with a wooden frame, and stirrups for holding it in place, for the purpose of evenly baking bread or cakes, in the manner hereinbefore described.

THOMAS C. RIDDELL.

Witnesses:
WM. B. WIGGINS,
JAMES MOORE.